United States Patent [19]

Lagerstedt et al.

[11] Patent Number: 4,559,068

[45] Date of Patent: Dec. 17, 1985

[54] ARRANGEMENT FOR THE SEPARATION OF PARTICLES

[75] Inventors: Jan. E. R. Lagerstedt, Malmö; Helge Andersson, Lund, both of Sweden

[73] Assignee: Tetra Pak International AB, Lund, Sweden

[21] Appl. No.: 640,827

[22] Filed: Aug. 15, 1984

[30] Foreign Application Priority Data

Aug. 25, 1983 [SE] Sweden .................................. 8304601

[51] Int. Cl.⁴ .............................................. B01D 50/00
[52] U.S. Cl. .................................... 55/399; 55/459 R; 55/459 A
[58] Field of Search .................... 55/184–186, 55/191, 192, 204, 205, 399, 453, 456, 457, 459 A, 459 R, 459 B, 442, 443; 209/144

[56] References Cited

U.S. PATENT DOCUMENTS

| 795,750 | 7/1905 | Allington | 55/399 |
| 1,565,318 | 12/1925 | Fisher | 55/457 X |
| 2,316,729 | 4/1943 | Tryon | 55/204 X |
| 2,638,219 | 5/1953 | Gordon et al. | 209/144 |
| 2,800,196 | 7/1957 | Arant | 55/456 |
| 3,349,548 | 10/1967 | Boyen | 55/457 |
| 3,988,132 | 10/1976 | Oranje | 55/399 |

FOREIGN PATENT DOCUMENTS 528808 8/1956 Canada .................................. 209/144

Primary Examiner—Charles Hart
Attorney, Agent, or Firm—Burns, Doane, Swecker & Mathis

[57] ABSTRACT

An arrangement for the separation of particles from a gas stream is provided with a helical guiding element and a collar having drop-forming elements. Consequently, on the one hand a strongly rotating movement is imparted to the air at a relatively low flow resistance, on the other hand it is processed by the drop-forming elements of the collar, which results in high capacity as well as effective separation.

12 Claims, 1 Drawing Figure

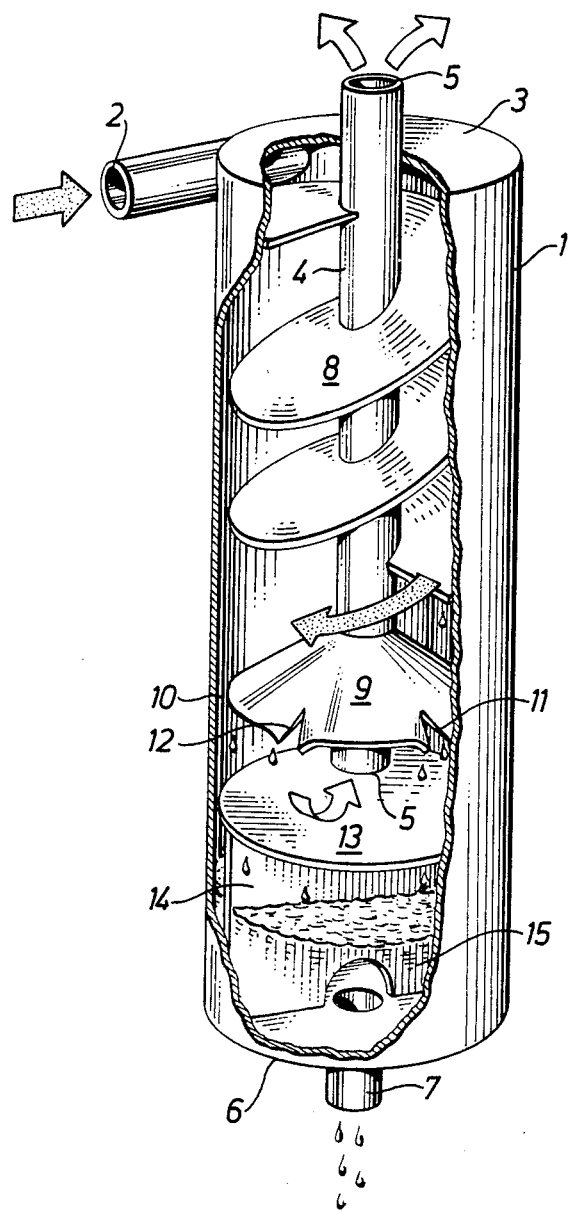

ARRANGEMENT FOR THE SEPARATION OF PARTICLES

FIELD OF THE INVENTION

The present invention relates to arrangements for separating particles from a gas stream, and more particularly to particle separator vessels having an inlet, an outlet and internal flow guides.

BACKGROUND OF THE INVENTION

It is desirable in many technical fields to be able to remove or separate different types of particles from a flowing gas. This need arises in the packaging industry in connection with the manufacture of aseptic packing containers, wherein a liquid sterilizing agent is applied to the packing material before the material comes into contact with the goods which are to be packed. For example, a known type of packing machine for manufacturing non-returnable packages for heat-treated, liquid foodstuffs such as milk applies a liquid sterilizing agent, usually hydrogen peroxide, to the packing material so as to reduce effectively the number of bacteria on the surface of the material during a certain time. Before the packing material comes into contact with the intended contents, the sterilizing agents are removed again through evaporation which takes place in such a way that heated sterile air blows clean and heats the material so that the sterilizing agent is evaporated and is entrained by the air away from the packing material. The machine includes a condensing compressor to obtain an air stream of sufficient pressure. The air used is mixed therefore with a sterilizing agent as well as with liquid (water) from the condensing compressor. Moreover some dust particles and the like may accompany the air, and it is desirable therefore to clean the air in an effective manner from these particles of varying type before the air is released into the open or is recycled for renewed usage. Since the quantity of air is great (approx. 100 m$^3$ per hour) and the requirement as to effectiveness is high, it has been difficult up to now to provide an effective separation with the known types of particle separators.

A known particle separator which has been tried is a vessel with inlet and outlet wherein with the help of a number of partition walls a labyrinth system is provided through which the air or gas mixed with particles is forced to flow. In this way a portion of the particles is certainly separated, but the effectiveness is relatively low and the unit has to be made very large to make possible the handling of the very large quantity of gas in the present case.

It is an object of the present invention to provide an arrangement for the separation of particles which is capable of handling and separating with a good result particles from a gas stream of appreciable volume.

It is a further object of the present invention to provide a particle separator of the aforementioned type which is simple to manufacture and simple to clean and is well suited in general for use in modern packing machines.

OBJECTS AND SUMMARY OF THE INVENTION

These and other objects have been achieved by the present invention which provides an arrangement for separating particles from a gas stream, comprising a substantially cylindrical vessel, an inlet conduit for defining an inlet directed tangentially of an upper inlet end of the vessel, an outlet conduit of the vessel which extends into the vessel from the inlet end and defines an outlet opening within the vessel, a helical guide extending from the inlet and a collar positioned between the guiding element and the outlet. The collar delimits a gaplike passage along the wall of the vessel.

The helical guiding element imparts rotation to the inflowing gas and conducts it towards the collar provided with drop-forming elements or tongues. As a result a large proportion of the particles in the air is separated and flung out against the walls of the vessel where the particles of water and sterilizing agent will be collected so as to flow down to the drain at the bottom of the vessel. Remaining particles will be guided towards the conical collar where a further separation takes place which removes the remaining water and peroxide so that the residual air, freed from dirt particles and liquid drops, can leave the vessel via the upwards directed outlet pipe. This design with a helical guiding element and a conical collar avoids the need for partition walls in the form of labyrinths which were used previously. Accordingly, the design appreciably reduces the resistance of the separator against the passage of gas so that its capacity becomes very high in relation to its size.

BRIEF DESCRIPTION OF THE DRAWING

A preferred embodiment of the arrangement in accordance with the invention will now be described in more detail with special reference to the attached drawing which shows schematically a particle separator partially cut open in accordance with the invention. For greater clarity only the details necessary for an understanding of the invention have been included. The FIGURE does not show the components used in practice for making possible the dismantling and cleaning of the separator.

DETAILED DESCRIPTION OF THE PREFERRED EMBODIMENT

The arrangement in accordance with the present invention comprises a substantially cylindrical vessel 1 which like the other components is manufactured from stainless steel. At the upper end of the vessel 1 is an inlet 2 which extends substantially tangentially into the vessel close to the upper end wall 3 of the same. Through the center of the end wall 3 extends an outlet pipe 4 which runs concentrically through the vessel and is of a length which corresponds substantially to ⅔rds of the height of the vessel 1. The upper end of the outlet pipe 4 extends a short distance above the end wall 3 and forms together with the lower part situated in the vessel an upwardly directed outlet 5.

At the lower end of the vessel 1 there is a bottom end wall 6 corresponding to the end wall 3. At the lower end of the vessel 1 there is also a drain 7 which extends through the end wall 6, preferably in its center.

In the vessel 1, beside the outlet pipe 4, a guiding element 8 is present which consists of a helical sheet which is joined to the outlet pipe 4 and extends around the same with an upper starting end on a level with the inlet 2 and a lower finishing end substantially in the middle between the upper and lower end walls. The guiding element 8 closes tightly against the outlet 4 but leaves a gap of approx. 3 mm between it and the cylindrical wall of the vessel 1. Some distance below the lower end of the guiding element 8 there is a substantially conical collar 9 whose diameter is slightly smaller than the inside diameter of the vessel 1 so that a narrow (approx. 3 mm) annular passage 10 is formed between the periphery of the collar 9 and the wall of the vessel. The periphery of the collar 9 is provided with a number of radial notches 11 which between them represent a number of drop-forming elements in the form of tongues 12. The corners of the tongues 12 delimited by the notches are bent alternatively upwards and downwards in relation to the conical surface of the collar 9.

As mentioned previously the conical collar 9 is situated between the lower end of the guiding element 8 and the lower open end of the outlet pipe 4. At some distance below the lower end of the outlet pipe 4 there is a circular screen 13 arranged horizontally whose diameter substantially corresponds to the diameter of the collar 9 which means that between the periphery of the screen 13 and the cylindrical inside wall of the vessel 1 there is also a narrow passage. The screen 13 is plane or slightly spherical and is supported by the bottom end wall 6 of the vessel 1 via a baffle plate 14 arranged vertically which extends from the screen 13 down to the end plate 6. The screen element 13 thus delimits a lower chamber 15 which serves as a collecting chamber for separated liquid drops and is adapted so as to be emptied via the drain 7 mentioned earlier in the lower end plate 6 of the vessel.

When the arrangement in accordance with the invention is used on a machine for the manufacture of sterile packages, hot air is fed into it which is used for the removal through vaporization of liquid sterilizing agent, e.g. hydrogen peroxide, from the sterilized packing material. The gas consisting of air and peroxide particles also contains a large amount of water particles since it passes a condensing compressor wherein it is mixed with sealing water of the compressor. The gas is fed to the arrangement in accordance with the invention via the inlet 2, and once it has entered into the substantially vertically mounted cylindrical vessel it is brought into rapid rotation with the help of the guiding element 8. The helical guiding element 8 at the same time conducts the gas downwards through the vessel 1 and during this movement a large part of the particles which are to be separated are flung out against the walls of the vessel 1 owing to the centrifugal force where they collect and flow downwards. After the gas has been rotated two or three turns with the help of the guiding element 8 it flows out at the lower open end of the guiding element where it expands so that further water precipitates. The outlet end of the guiding element 8 is directed obliquely downwards towards the conical collar 9 and the gas mixture now will be rotated along the upper surface of the collar 8 to flow successively down through the passage 10 and into the outlet 5. During the rotation along the top side of the collar 9 further particles and liquid drops are collected along the periphery of the collar, where the drop-forming elements 12 successively guide the drops to the inside of the vessel 1 where, just as the particles separated earlier, they flow downwards in the vessel. Owing to the special design of the tongues formed by means of the notches 11, more particularly the corners of the tongues bent alternatively upwards and downwards, a vigorous processing of the gas to separate the particles is achieved. This is further increased by the corners of the tongues situated before each notch, seen in the direction of flow, being bent downwards so that a large portion of the gas comes into direct contact with the topside of the collar 9 and remaining particles are captured and entrained by the drop-forming elements.

After the air has passed the collar 9 its treatment is finished and the air freed from particles can discharge into the outlet pipe 4 to be returned via the upwards directed outlet 5 for renewed heating and reuse.

To prevent the gas rotating at high speed to whirl up again the particles or the liquid which has collected at the bottom of the vessel, on the one hand the screen 13 is provided which delimits the main volume of the vessel 1 from the lower chamber 15, and on the other hand the vertical baffle plate 14, which prevents the liquid collected in the chamber 15 from being brought into rotation by the rotating gas. Consequently the collected liquid can be drained off successively via the drain 7 without air being mixed in to an appreciable extent. It is an advantage to control the draining off so that a certain volume of liquid is always present in the lower part of the vessel in order to prevent discharge of gas via the drain. This control may be done in a known manner by means of a float or valve.

A further possibility of ensuring an effective final separation of liquid consists in designing the outlet pipe in the form of two pipes placed concentrically inside one another. Any remaining liquid drops can then precipitate on the inside of the outer pipe, where the rate of flow is lower, and flow back to the lower part of the vessel and the drain 7. The pipes are joined at the upper end and only the inner pipe extends out through the upper end wall of the vessel.

The arrangement in accordance with the invention has proved in practice to function well. It has a high capacity in relation to its size while at the same time its power of particle separation is very good. The high capacity is due first and foremost to the ability of the inflowing gas to flow relatively freely through the arrangement without its flow being hindered by labyrinth arrangements or the like. The effective separation is due to the high speed of rotation when the gas is conducted by the guiding element 8 and above all to the final contact with the collar 9 which has proved to be of great significance for the final result.

It is to be understood that the present invention may be embodied in other specific forms without departing from the spirit or essential charateristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. An arrangement which separates liquid particles from a gas stream, comprising:
    a substantially cylindrical vessel having an inlet end and a bottom end;
    inlet means tangential of said inlet end for admitting said gas stream into said vessel;
    a conduit extending into said vessel from said inlet end, said conduit having an open end defining an outlet internal of said vessel;
    a guiding element extending helically from said inlet means downwardly about said conduit;
    collar means for delimiting a gaplike passage along the wall of the vessel positioned between said guiding element and said outlet and spaced from said guiding element and said outlet, said guiding element guiding said gas stream obliquely downwardly toward said collar means so that the gas stream is rotated along an upper surface of said collar means.

2. The arrangement in accordance with claim 1, wherein the collar is conical.

3. The arrangement in accordance with claim 2, wherein the drop-forming elements comprise a plurality of tongues formed by radial notches in the collar.

4. The arrangement in accordance with claim 3, wherein a peripheral edge of the collar is provided with a number of drop-forming elements.

5. The arrangement in accordance with claim 4, wherein corners of the tongues are bent alternately upward and downwards in relation to a conical surface of the collar.

6. The arrangement in accordance with claim 5, wherein the corners of the tongues situated before each notch as seen in the direction of flow are bent downwardly.

7. The arrangement in accordance with claim 6, wherein the collar is arranged around said conduit.

8. The arrangement in accordance with claim 2, 3 or 7, wherein said conduit extends through an upper end wall of the vessel and said outlet is situated at a distance above a bottom end wall of the vessel, said arrangement further comprising a screen element outlet and the bottom end wall, said screen element partly delimiting a lower chamber for the collection of separated particles.

9. The arrangement in accordance with claim 8, wherein the lower chamber includes a drain for draining collected particles.

10. The arrangement in accordance with claim 9, wherein the lower chamber includes a baffle plate.

11. The arrangement in accordance with claim 2, wherein the collar is conical.

12. The arrangement in accordance with claim 11, wherein the collar is arranged around said conduit.

* * * * *